United States Patent [19]
Smith et al.

[11] Patent Number: 5,230,726
[45] Date of Patent: Jul. 27, 1993

[54] SPIRAL WRAPPED GAS GENERATOR FILTER

[75] Inventors: Bradley W. Smith, Ogden; Linda M. Rink, Liberty, both of Utah

[73] Assignee: Morton International, Inc., Chicago, Ill.

[21] Appl. No.: 876,270

[22] Filed: Apr. 30, 1992

[51] Int. Cl.⁵ .................. B01D 27/06; B01D 29/07
[52] U.S. Cl. ........................ 55/487; 55/498; 55/520; 55/DIG. 5; 210/490; 210/497.1; 493/301; 493/303; 493/349; 493/941
[58] Field of Search ............. 55/482, 485–489, 55/498, 520, DIG. 5; 210/490, 497.1; 493/299, 301, 303, 304, 349, 941

[56] References Cited

U.S. PATENT DOCUMENTS

| | | | |
|---|---|---|---|
| 930,401 | 8/1909 | Monteagle | 210/497.1 X |
| 2,035,758 | 3/1936 | Pierce | 210/497.1 X |
| 2,380,111 | 7/1945 | Kasten | 210/497.1 X |
| 2,574,221 | 11/1951 | Modigliani | 55/489 X |
| 2,906,317 | 9/1959 | Keyes | 154/28 |
| 3,279,333 | 10/1966 | Blair et al. | 493/299 X |
| 3,327,596 | 6/1967 | Lee, Jr. et al. | 493/301 |
| 3,356,226 | 12/1967 | Miller, Jr. et al. | 210/497.1 X |
| 3,406,614 | 10/1968 | Martin et al. | 493/299 X |
| 3,442,392 | 5/1969 | Skelley | 55/DIG. 5 |
| 3,616,929 | 11/1971 | Manjikian | 210/321 |
| 3,804,259 | 4/1974 | Riggleman et al. | 210/490 |
| 3,877,882 | 4/1975 | Lette et al. | 55/487 X |
| 3,909,174 | 9/1975 | Blair et al. | 55/DIG. 5 |
| 4,101,423 | 7/1978 | Merrill et al. | 210/494 M |
| 4,296,084 | 10/1981 | Adams et al. | 423/351 |
| 4,398,931 | 8/1983 | Shevlin | 55/341 R |
| 4,649,827 | 3/1987 | Brasquies et al. | 493/299 X |
| 4,717,374 | 1/1988 | Elias | 493/299 X |
| 4,878,690 | 11/1989 | Cunningham | 280/741 |
| 4,882,056 | 11/1989 | Degen et al. | 210/490 |
| 4,917,660 | 4/1990 | Spaller, Jr. et al. | 493/299 X |
| 4,998,751 | 3/1991 | Paxton et al. | 280/741 |
| 5,039,413 | 8/1991 | Harwood et al. | 55/498 X |

FOREIGN PATENT DOCUMENTS

| | | | |
|---|---|---|---|
| 53-002390 | 1/1978 | Japan | 210/497.1 |
| 55-022382 | 2/1980 | Japan | 210/497.1 |
| 55-039279 | 3/1980 | Japan | 210/497.1 |

Primary Examiner—Robert Spitzer
Attorney, Agent, or Firm—Mark LaMarre; Gerald K. White

[57] ABSTRACT

An improved method for the continuous fabrication of filter units for use in automotive air bag inflators by spirally winding a hollow cylindrical core, at least one filter layer, and an outer layer to form a continuous spirally wound filter unit. The continuous spirally wound filter unit is then cut into individual filter unit of desired length by the use of conventional cutting device.

22 Claims, 3 Drawing Sheets

SPIRAL WRAPPED GAS GENERATOR FILTER

BACKGROUND OF THE INVENTION

1. Field of the Invention

This invention relates generally to inflatable type modular occupant restraint systems for passenger vehicles or, as they are more commonly known, air bag restraint systems. Such a system may be installed in an automobile or other vehicle, at least in part on the steering wheel for the protection of the driver and also in the dashboard or passenger side instrument panel for passenger protection in the event of a collision. More particularly, this invention relates to an improved filter unit for use in passenger side air bag restraint systems and a method for manufacturing the filter unit.

2. Description of Related Art

The air bag restraint system is located forward of the occupants and normally is in a deflated condition. In the event of a crash, however, the air bag is inflated in a matter of 20 to 40 milliseconds by a gas produced by the burning of a gas generant material in an inflator. Common features of such inflators that are used for the inflation of air bag cushion restraint systems are the inclusion in a housing of a gas generant composition containing a pelletized alkali metal azide contained in a basket and a filter unit external to the basket to cool the gas positioned between the basket and gas discharge orifices, as defined by the housing. The gas generant is ignited by an igniter. The gas generant burns rapidly usually with a temperature of about 1200° C., and develops pressure in the housing in excess of 2000 psia. Further, the gas that is generated contains combustion residue including fine molten particles of metal and/or reactant oxides. The pressure of combustion gases resulting from the rapid burning of the gas generant material causes gas to rush into the bag to effect a rapid rate of inflation thereof. The cooling and filtration of the gas to remove the fine particles for the safety and comfort of the passengers is of great importance.

Filter units typically available in the art include alternating layers of screen and ceramic paper. For example, Paxton et al., U.S. Pat. No. 4,998,751, which patent is assigned to the assignee of the present invention, disclose a filter which includes two wraps of nickel coated carbon or stainless steel 30 mesh screen, then metal filter such as 80×700 or 50×250 mesh stainless steel or 40×180 mesh nickel coated carbon steel, then a single wrap of ceramic filter paper 0.080 inches thick, followed by two wraps of 30 mesh stainless steel or nickel coated carbon steel. A wrap of 5 mesh stainless steel or nickel coated carbon may be provided adjacent the wall of the tubular portion to allow space around apertures therein for the free passage of generated gases.

The filter units are, typically, manufactured by rolling the different filter materials circumferentially around a mandrel similar to rolling wrapping paper circumferentially around a core. For example, Cunningham, U.S. Pat. No. 4,878,690, which patent is assigned to the assignee of the present invention, discloses a filter unit of this type of manufacture. The filter units are manufactured as single units by hand and with the aid of a machine. The geometry of the filter unit is determined by the vehicle into which the filter unit will be installed.

The individual filter elements for each filter unit are cut to size and are placed by hand on the mandrel of an automatic wrapping machine which wraps the filter and spot welds the outer layer. The filter unit then is removed from the wrapping machine by hand and the cycle is repeated for the next filter unit. The cutting of each piece of filter material and the hand placement of each piece of filter material on the wrapping machine significantly increases the time of manufacture, (cycle time), for each filter unit. This manufacturing system is incompatible with the high volume production requirements necessary to meet the demands of the automotive industry.

The consistent and economical manufacture of filter elements for passenger side gas generators which will efficiently cool and clean gas from the gas generant is of great concern. This must be done in light of the fact that the size of the passenger side generator, and therefore the filter element, is strongly dependent on the geometry of the automobile's interior and therefore varies significantly from automobile to automobile.

The use of spiral wrapping is disclosed in Merrill et al., U.S. Pat. No. 4,101,423, for microporous layer over a porous inner layer for filtering bacteria from fluids. Shevlin, U.S. Pat. No. 4,398,931, discloses spiral wrapping a woven ceramic filter material over a rigid tubular cage for radially-inward filtration of hot industrial gases. The Shevlin invention is designed for a pressure drop of from 2 to 6 inches of water at a flow rate of 3.2 to 24.2 per minute per $dm^2$ of filter area.

SUMMARY OF THE INVENTION

An object of this invention is to provide an improved method of manufacturing air bag inflator filter units which reduces the time required to manufacture a filter unit for a passenger side automotive air bag inflator. Further, an object of this invention is to provide an improved method of manufacturing air bag inflator filter units which reduces the set-up time required for the manufacture of such a filter unit. Another object of this invention is to provide an improved method of manufacturing air bag inflator filter units which provides for the rapid change in the length of the filter unit.

These objectives have been achieved by a novel filter element and a means for manufacturing the same. The filter element includes a hollow cylindrical core open at both ends, at least one filtering layer, and an outer layer of gas permeable material which holds the filter layer in a cylindrical form about the hollow cylindrical core without the application of any external forces.

The hollow cylindrical core is made by spirally winding a first gas permeable support material which has a first edge and a second edge. The material from which the first gas permeable support material is made is bendable such that the material will conform to and retain the shape of the form over which it is pressed. The second edge of the first gas permeable support material is joined to the first edge of the adjacent wrap such that the hollow cylindrical core retains a cylindrical form without need for additional clamping. The second edge may overlap the adjacent first edge or the second edge may abut the first edge.

The filtering layer is spirally wound radially outward of the hollow cylindrical core. The filtering layer further comprises at least one layer of spirally wound filter media, such as a ceramic paper, and at least one layer of spirally wound second gas permeable support material such as a metal screen radially outward of the filter media. The second gas permeable support material having an inner surface and outer surface. The layers of filter media and gas permeable support material may contain one or more layers of the respective materials. Optionally, at least one layer of a third gas permeable material, such as a coarse mesh metal screen can be spirally wrapped radially outward of the hollow cylindrical core and radially inward of the filter media.

The outer layer is spirally wound radially outward of the filter layer and contains at least one layer of spirally wound fourth gas permeable support material, such as metal screen having inner and outer surfaces, a third edge and a fourth edge, and an end portion. The inner surface of the most radially outward third edge and fourth edge are joined to the outer surface of the next most radially inward layer of the fourth gas permeable support material or to the outer surface of the radially most outward second gas permeable material of the filter layer by bonding means, such that the outer layer retains the outer layer and the filter layer in a cylindrical relation about the hollow cylindrical core without further structural support.

The respective layers of filter material, filter media, first gas permeable support material, second gas permeable support material, third gas permeable support material, and fourth gas permeable support material are spirally wound in such a way that the seam of one layer does not coincide with the seams of the other layers of filter material. The overlap of individual filter materials at the seams of adjacent wraps should be kept to a minimum such that thickness of the filter is not increased without increasing the filtering capacity of the filter unit. A slight overlap is necessary so that no gaps are formed which permit the unfiltered flow of generated gas.

The invention also comprises a method for continuous fabrication of filter units for use in automotive air bag inflators comprising spirally winding a first gas permeable support material, which material is flexible, around a rotating mandrel to form a hollow cylindrical core having internal and external surfaces, spirally winding at least a filter layer radially outward of the hollow cylindrical core, and finally spirally winding at least an outer layer radially outward of the filter layer.

The first gas permeable support material has a first edge and a second edge. The first gas permeable sheet is spirally wound such that the first edge of each wrap abuts the second edge of the adjacent wrap or the wrap linearly downstream of the spiral wrapping process. The first edge of the first gas permeable material is joined to the second edge of the first gas permeable material of the adjacent spiral wrap by means such that the hollow cylindrical core retains a cylindrical form without the application of external forces.

Next, at least one filter layer is spirally wound radially outward of the cylindrical core. Each filter layer comprises spirally winding at least one layer of filter media having a first edge and a second edge and inner and outer surfaces radially outward of the cylindrical core, and spirally winding at least one layer of a second gas permeable support material radially outward of the filter media. The second gas permeable support material has an inner and an outer surface and third and fourth edges. Optionally, at least one layer of a third gas permeable support material is spirally wound radially outward of the cylindrical core and radially inward of the first filter layer.

Following the last filter layer an outer layer is spirally wound radially outward of the filter layer. The outer layer comprises at least one layer of a fourth gas permeable support material. The fourth gas permeable support material has inner and outer surfaces, fifth edges and sixth edges, and an end portion. The inner surface of the fifth edge and sixth edge are joined to the next most radially inward layer of the fourth gas permeable support material or to the outer surface of the radially most outward second gas permeable support material of the filter layer by joining means such that the outer layer retains the outer layer and the filter layer in a cylindrical relation about the core without further structural support. Thus, a continuous spiral wound filter unit is formed.

Finally, the continuous spiral wound filter unit is cut transversely at intervals to form individual spiral wound filter units of the desired length.

BRIEF DESCRIPTION OF THE DRAWINGS

With this description of the invention, a detailed description follows with reference being made to the accompanying figures of drawing, which form part of the specification, in which like parts are designated by the same reference numbers, and of which.

DETAILED DESCRIPTION OF THE INVENTION

Figure 1:
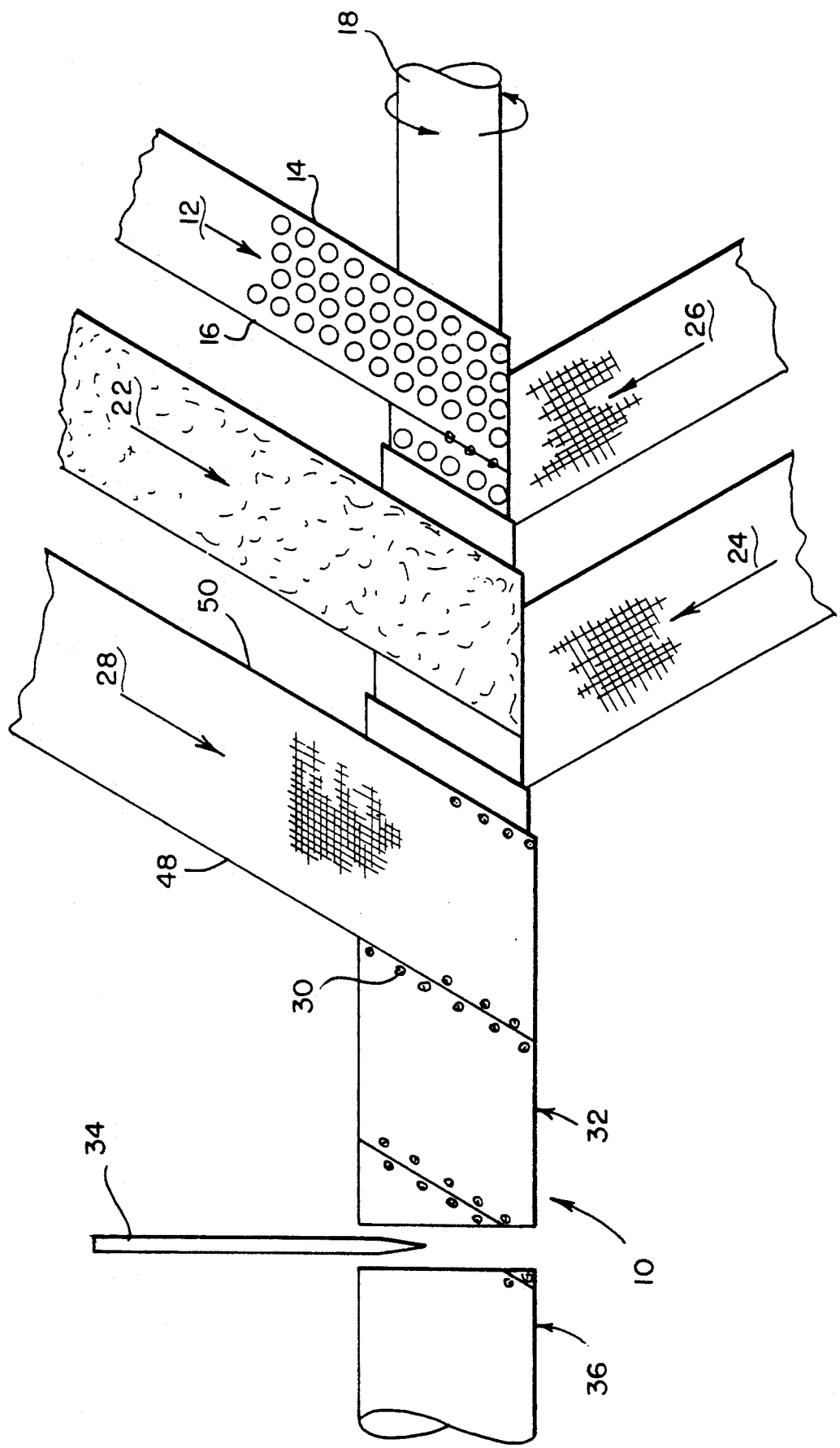
FIG. 1 is a front plan view illustrating the manufacturing of a spiral wrapped filter unit.
Figure 2:
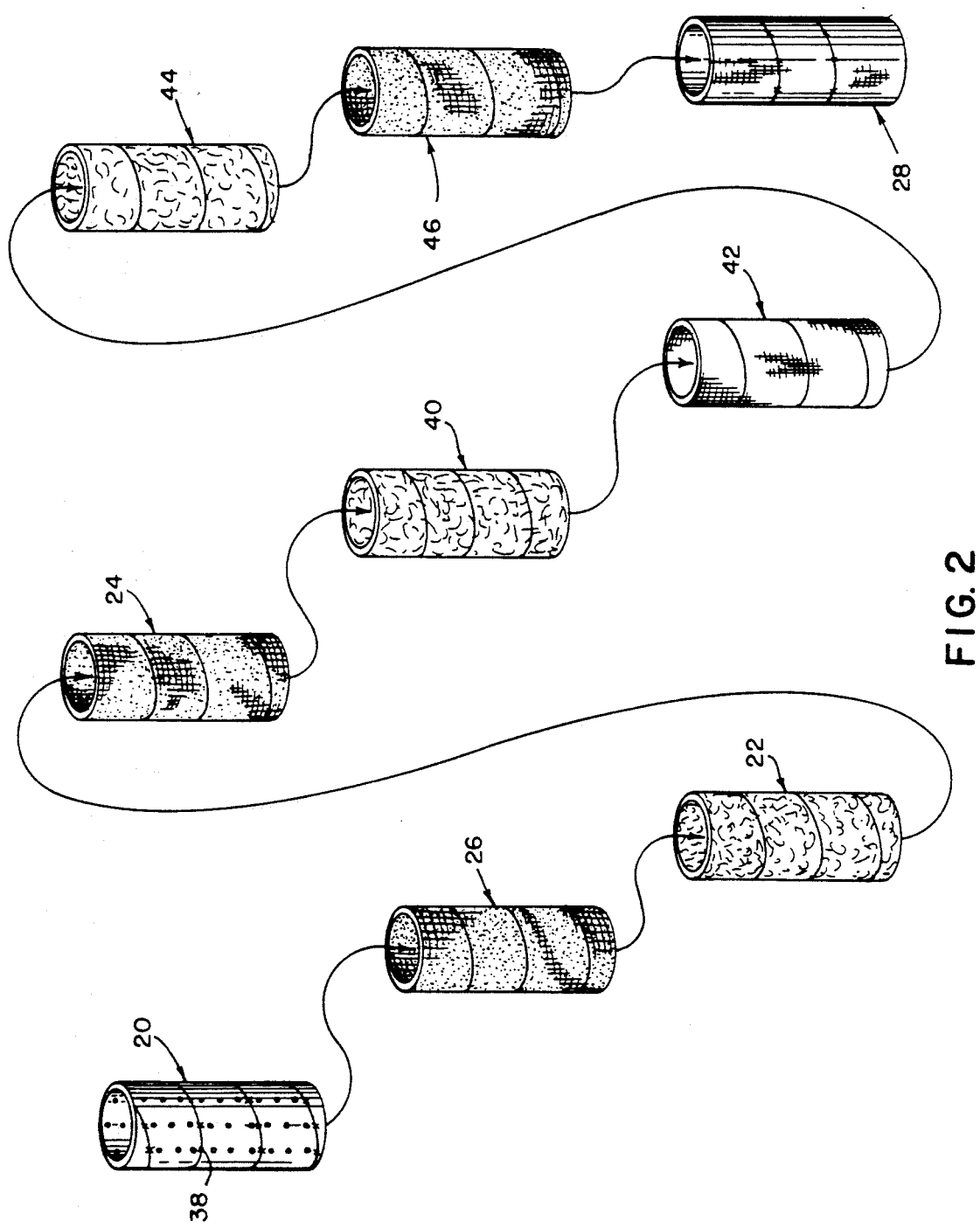
FIG. 2 is a series of views showing the individual filter elements broken out of the filter unit.

As best seen in FIG. 1, a method for the continuous fabrication of a passenger side air bag inflator filter is shown generally at 10. A first gas permeable support material 12, having a first edge 14 and a second edge 16, is placed on a rotating center mandrel 18. The first edge 14 of the first gas permeable support material is joined to the second edge 16 of the adjacent wrap. The first gas permeable support material 12 forms a hollow cylindrical core 20, as shown in FIG. 2., which maintains its cylindrical shape without external clamping. Next, a layer of first filter media 22 is spirally wound radially outward of the first gas permeable support material 12. Next, a layer of second gas permeable support material 24 is spirally wound radially outward of the first filter media 22. Additional layers of filter media (not shown) and gas permeable support materials (not shown) are added to build sufficient layers of filter media and second gas permeable support material to produce a filter with the appropriate cooling and filtering capacity. Optionally, a third gas permeable support material 26 can be spirally wound radially outward of the first gas permeable support material 12 prior to the application of the first filter media 22. An outer layer 28 of a fourth gas permeable support material is spirally wound around the filter media and gas permeable support material and is joined by spot welds 30, or the like, so as to retain the shape of the continuously fabricated filter unit 32, which is manufactured. The continuous fabricated filter unit 32 is advanced along the length of the mandrel by conventional means as the several wraps are wrapped about, the mandrel.

Each layer of filter material; first gas permeable support material, first filter media, second gas permeable support material, third gas permeable support material, and fourth gas permeable support material, are held onto the center mandrel 18 by individual compression rollers (not shown). These compression rollers can be mounted such that the axis of the compression rollers are perpendicular to the paths of the individual filter materials which they hold to the center mandrel 18. The compression rollers are located at the point where the respective filter materials start to wind about the center mandrel 18. The continuously fabricated filter is then cut to size by a rotary cutting blade 34, or the like to form individual filter units 36 of the desired length which maintain their shape without the application of external forces. The respective filtering materials are fed onto the center mandrel in such a way that the overlap of adjacent wraps is maintained at a minimum. Sufficient overlap is required such that no gaps form in the respective filter layers which would permit the unfiltered flow of generated gas.

A preferred filter unit as manufactured by the method of this invention is shown in a series of views in FIG. 2. The hollow cylindrical core 20 is shown with spot welded seams 38 which join first edge 14 and second edge 16 of adjacent wraps of first gas permeable material 12. The first gas permeable material 12 can be made from coarse screening. More preferably the material from which the first gas permeable material 12 is made of perforated sheet carbon steel. Stainless steel can be used; however, it is not required for good performance of the resulting filter unit. The perforations should be such that at least 25 per cent by area of the material is permeable to gas. More preferably the perforations should be such that from about 25 per cent to about 65 per cent of the material is permeable to gas in order to allow for the rapid dispersion of gas through the filter unit.

The hollow cylindrical core 20 is spirally wrapped with an optional third gas permeable support material 26. Preferably at least two layers of third gas permeable material are used. These gas permeable support materials can be made of any suitable high temperature conductive material such as metal screen made from carbon steel, nickel-plated carbon steel, stainless steel, or compressed non-woven material. Stainless steels which can be used with this invention include, but are not limited to the 300 series stainless steels, i.e., 301, 304, 316, and 330. The third gas permeable support material 26 should preferably be of coarse mesh such as from about 18 to about 30 mesh (per Fed. Std. RR-W-360). The first filter media 22 is spirally wound about the hollow cylindrical core 20 and the optional third gas permeable support material 26.

The first filter media and all subsequent layers of filter media can be any high temperature ceramic-based filter papers available for use in air bag inflator filters. Preferably this ceramic-based filter paper should be able to withstand temperatures up to about 1500° C. and a volumetric flow rate of between from about 250 to about 1870 cfm/ft$^2$, with a permeability of between about 40 to about 200 cfm/ft$^2$ at a pressure drop of $\frac{1}{2}$ inch of water. Such filter medias are manufactured by Lydall Inc., Technical Papers Division, of New Hampshire and Carborundum of New York.

A second gas permeable support material 24 is spirally wound radially outward of the first filter media 22. The second material 24 like the optional third gas permeable support material 26 can be made of carbon steel or stainless steel with a mesh size from about 18 to about 30 mesh. A coarser or finer mesh screen can be used depending on the amount of cooling and filtration required from the filter element being manufactured. Preferably, in order to support the ceramic-based filter media which normally is of low tensile strength, the ceramic-based filter material and a layer of gas permeable support material can be combined after feeding from their respective roller and spirally wound around the center mandrel 18 simultaneously.

The preferred filter unit is further constructed using second filter media 40 and fourth gas permeable support material 42. The second filter media 40 and fourth gas permeable support material 42 are as described hereinabove. Multiple layers of ceramic-based filter media and screen may be used as needed by the ultimate requirement of the filter element. A third filter media 44 and a fifth gas permeable support material 46 are included in the preferred embodiment of this invention as shown in FIG. 2. Also, each layer of screen and ceramic-based filter media may contain more than one wrap of the respective filter material. The last layer of filter screen, prior to the outer wrap should be of finer mesh, such as 24×110×45×170 mesh, commonly known as Dutch woven, in order to more completely cool and filter the gas. A non-woven metallic or metallic/ceramic-based filter media may also be used. This is similar in nature to compressed steel wool.

Finally, the outer layer 28 is formed by spirally winding at least one layer of fourth gas permeable support material, the outer layer, the edges of which are spot welded 30 or fused to the underlying layer of gas permeable support so as to hold the continuously fabricated filter unit 32 in cylindrical form. To spot weld the outer layer, 28, third edge 48 and fourth edge 50, as shown in FIG. 1, of adjacent spiral may be overlapped slightly, approximately one-half the length of the mesh opening, and the radially most outward layer of third screen can then be spot welded 30. The overlapping of adjacent wraps is not preferred as this adds to the overall thickness of the filter unit 36 without adding to the filtering efficiency of the filter unit 36.

Figure 3:
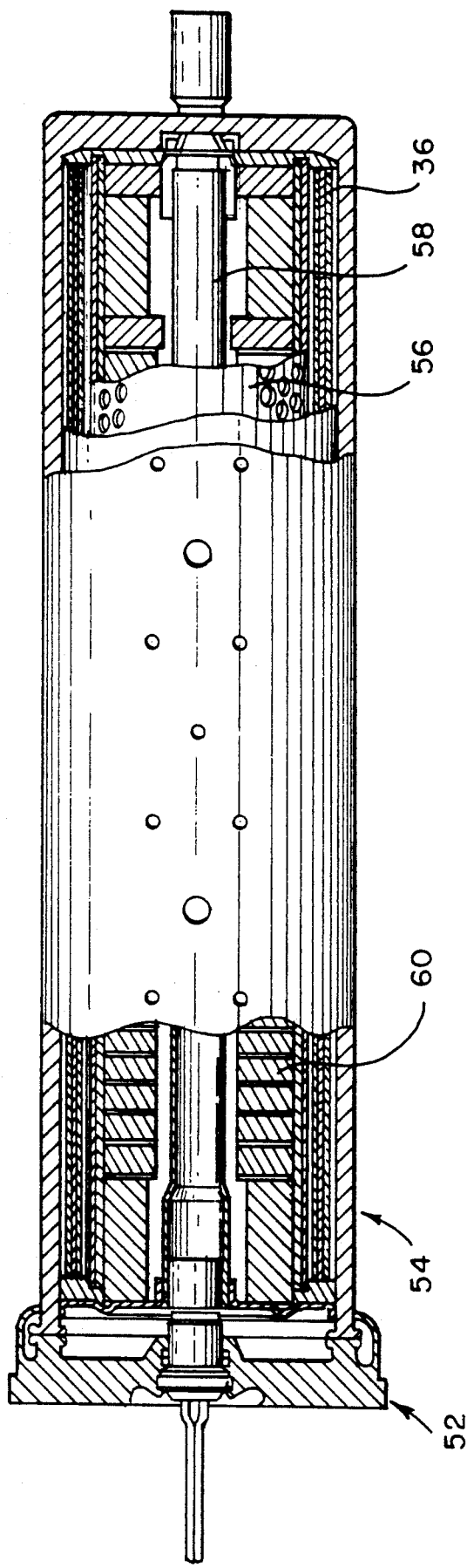
FIG. 3 is a fragmented view illustrating the placement of the filter unit in a passenger side automotive air bag inflator.

The inflator 52, as shown in FIG. 3, can be any of a number of known constructions, including the construction illustrated in U.S. Pat. No. 4,296,084 to Schneiter, which patent is assigned to the assignee of the present invention. The inflator 52 includes generally an outer housing 54 into which is inserted the spiral wound filter unit 36 of this invention. An inner basket 56 can then be inserted radially inward of the filter unit 36, however, with this invention such a basket may not be needed. An igniter 58 containing igniter granules and the appropriate ignition system is then inserted into the center of the inflator 52. Gas generant 60 is then loaded in to the inflator 52 which is then sealed in a conventional manner known to those in the art.

Thus, in accordance with the invention, there has been provided an improved method for the continuous fabrication of a filter unit for use with automotive air bag inflators. There has also been provided an improved method for the fabrication of filter units for use in automotive air bags which reduces the time needed to manufacture individual filter units. Additionally, there has been provided an improved method for the fabrication of filter units for use in automotive air bag inflators which reduces the cycle time in the manufacture of the filter units.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A gas generator filter element comprising;
   a hollow cylindrical core having first and second open ends and internal and external surfaces, comprising a spirally wound first gas permeable support material of bendable material having a first edge and a second edge, forming adjacent wraps of said first gas permeable support material, wherein said first edge of said first gas permeable support material is joined to said second edge of said first gas permeable support material of said adjacent wrap by joining means such that said hollow cylindrical core retains a cylindrical form without need for additional clamping;
   at least one filter layer spirally wound radially outward of said core, wherein each filter layer comprises at least one layer of spirally wound first filter media, having an inner and outer surface, and at least one layer of spirally wound second gas permeable support material radially outward of said first filter media; and
   an outer layer radially outward of said spirally wound filter layer comprising at least one layer of spirally wound third gas permeable support material forming adjacent wraps of said third gas permeable support material wherein said third gas permeable support material having inner and outer surfaces, a third edge and a fourth edge, and an end portion, wherein said third edge and said fourth edge of the most radially outward layer of said third gas permeable support material is joined to the next most radially outward gas permeable support material by joining means such that said outer layer retains said outer layer and said filter layer in a cylindrical relation about said core without further structural support.

2. A gas generator filter element of claim 1 further comprising a fourth gas permeable support material radially outward of said hollow core and radially inward of said first filter media.

3. A gas generator filter element of claim 2 wherein said fourth gas permeable support material is screen.

4. A gas generator filter element of claim 2 comprising said hollow cylindrical core, a plurality of fourth gas permeable support materials spirally wound radially outward of said hollow cylindrical core, three filter layers spirally wound radially outward of said fourth gas permeable material, wherein each of said filter layers comprise a spirally wound first filter media and a spirally wound second gas permeable support material radially outward of said first filter media, and an outer layer radially outward of said spirally wound filter layers, comprising two spirally wound third gas permeable support materials forming adjacent wraps of said third gas permeable support materials, wherein said third gas permeable support material having inner and outer surfaces, third and fourth edges, and an end portion, wherein said third edge and said fourth edge of the most radially outward layer of said third gas permeable support material is joined to the next most radially outward gas permeable support material by bonding means such a that said outer layer retains said outer layer and said filter layer in a cylindrical relation about said core without further structural support.

5. A gas generator filter element of claim 1 wherein said first gas permeable support material is in the form of a perforate sheet.

6. A gas generator filter element of claim 1 wherein said second gas permeable support material is screen.

7. A gas generator filter element of claim 1 wherein said third gas permeable support material is screen.

8. A gas generator filter element of claim 1 wherein said core is made from a material selected from a group consisting of carbon steel and 300 series stainless steel.

9. A gas generator filter element of claim 1 wherein said second gas permeable support material is made from a material selected from a group consisting of carbon steel, nickel-plated carbon steel, and 300 series stainless steel.

10. A gas generator filter element of claim 1 wherein said second gas permeable support material is made from screen having a mesh size from about 18 to about 30 mesh.

11. A gas generator filter element of claim 1 wherein said second gas permeable support material is made from screen having a mesh size of $45 \times 70$.

12. A gas generator filter element of claim 1 wherein said first filter media is made from a ceramic-based filter paper, wherein said filter paper is able to withstand temperatures up to about 1500° C. and a volumetric flow rate of between from about 250 to about 1870 cfm/ft$^2$, with a permeability of between about 40 to about 200 cfm/ft$^2$ at a pressure drop of $\frac{1}{2}$ of water.

13. A method for continuous fabrication of filter units for use in automotive air bag inflators comprising:
    spirally winding a first gas permeable support material of bendable material around a rotating mandrel to form a hollow cylindrical core having internal and external surfaces, said first gas permeable support material having a first edge and a second edge, forming adjacent spiral wraps of said first gas permeable support material wherein said first edge of said first gas permeable support material is joined to said second edge of said first gas permeable support material of said adjacent spiral wrap by means such that said cylindrical core retains a cylindrical form without the application of external forces;
    spiral winding at least one filter layer radially outward of said cylindrical core, wherein each filter layer comprises spirally winding at least one layer of first filter media radially outward of said hollow cylindrical core and spirally winding at least one layer of a first gas permeable support material layer radially outward of said first filter media;
    spirally winding an outer layer radially outward of said filter layer comprising spirally winding at least one third gas permeable support material forming adjacent spiral wraps of said third gas permeable support material, wherein said third gas permeable support material having inner and outer surfaces, third and fourth edges, and an end portion, wherein said third edge and said fourth edge of the most radially outward spiral wrap of said third gas permeable support material is joined to the next most radially outward layer by means such that said outer layer retains said outer layer and said filter layer in a cylindrical relation about said cylindrical core without further structural support, thereby forming a continuous spiral wound filter unit; and
    transversely cutting said continuous spiral wound filter unit at intervals to form individual spiral wound filter units of desired lengths.

14. A method for continuous fabrication of filter units for use in automotive air bag inflators of claim 13 further comprising a fourth gas permeable support material radially outward of said hollow core and radially inward of said first filter media.

15. A method for continuous fabrication of filter units for use in automotive air bag inflators of claim 13 wherein said first gas permeable support material is screen.

16. A method for continuous fabrication of filter units for use in automotive air bag inflators of claim 13 wherein said second gas permeable support material is screen.

17. A method for continuous fabrication of filter units for use in automotive air bag inflators of claim 13 wherein said third gas permeable support material is screen.

18. A method for continuous fabrication of filter units for use in automotive air bag inflators of claim 13 wherein said first gas permeable material made from a material selected from a group consisting of carbon steel, nickel-plated carbon steel, and series 300 stainless steel.

19. A method for continuous fabrication of filter units for use in automotive air bag inflators of claim 13 wherein said second gas permeable support material is made from a material selected from a group consisting of carbon steel, nickel-plated carbon steel, and series 300 stainless steel.

20. A method for continuous fabrication of filter units for use in automotive air bag inflators of claim 13 wherein said second gas permeable support material is screen with a mesh size from about 18 to about 30 mesh.

21. A method for continuous fabrication of filter units for use in automotive air bag inflators of claim 13 wherein said first filter media is made from a ceramic-based filter paper, wherein said filter paper is able to withstand temperatures up to about 1500° C. and a volumetric flow rate of between from about 250 to about 1870 cfm/ft$^2$, with a permeability of between about 40 to about 200 cmf/ft$^2$ at a pressure drop of $\frac{1}{2}$ inches of water.

22. A method for continuous fabrication of filter units for use in automotive air bag inflators of claim 13 wherein said third gas permeable support material is screen with a mesh size from about 18 to about 30 mesh.

* * * * *

UNITED STATES PATENT AND TRADEMARK OFFICE
CERTIFICATE OF CORRECTION

PATENT NO. : 5,230,726
DATED : July 27, 1993
INVENTOR(S) : Smith et al.

It is certified that error appears in the above-identified patent and that said Letters Patent is hereby corrected as shown below:

At column 5, line 7, "like" should be --like,--.

At column 5, line 50, "high temperature" should be --high-temperature --.

At column 6, line 19, "24X110X45X170" should be -- 24X110 to 45X170 --.

At column 6, line 50, "in to" should be -- into --.

At column 7, line 66, "such a that" should be -- such that --.

At column 8, line 30, insert -- inch -- after "1/2".

Signed and Sealed this

Twenty-first Day of June, 1994

Attest:

BRUCE LEHMAN

Attesting Officer            Commissioner of Patents and Trademarks